US009047689B2

(12) United States Patent
Stolte et al.

(10) Patent No.: US 9,047,689 B2
(45) Date of Patent: Jun. 2, 2015

(54) METHOD AND APPARATUS FOR VISUALIZING MULTI-DIMENSIONAL WELL LOGGING DATA WITH SHAPELETS

(75) Inventors: Christian Stolte, Winsen (DE); John C. Rasmus, Richmond, TX (US); Koji Ito, Sugar Land, TX (US); Shahzad A. Asif, Richmond, TX (US); Denis Heliot, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 332 days.

(21) Appl. No.: 13/375,507

(22) PCT Filed: Oct. 15, 2009

(86) PCT No.: PCT/US2009/060793
§ 371 (c)(1),
(2), (4) Date: Apr. 25, 2012

(87) PCT Pub. No.: WO2010/141038
PCT Pub. Date: Dec. 9, 2010

(65) Prior Publication Data
US 2012/0201425 A1 Aug. 9, 2012

Related U.S. Application Data

(60) Provisional application No. 61/184,259, filed on Jun. 4, 2009.

(51) Int. Cl.
*G06K 9/00* (2006.01)
*G06T 19/00* (2011.01)
*G01V 3/38* (2006.01)

(52) U.S. Cl.
CPC .. *G06T 19/00* (2013.01); *G01V 3/38* (2013.01)

(58) Field of Classification Search
None
See application file for complete search history.

(56) References Cited

U.S. PATENT DOCUMENTS 5,638,337 A * 6/1997 Priest .............................. 367/27
6,078,867 A 6/2000 Plumb et al.
6,852,530 B2 * 2/2005 Silver et al. ................... 435/325

(Continued)

OTHER PUBLICATIONS

Curtis, et al., "Rock Visualization System Technical Description (RVS v. 3.5)", Swedish Nuclear Fuel and Waste Management Co., Mar. 2004, pp. 1-46.

(Continued)

*Primary Examiner* — Hadi Akhavannik
(74) *Attorney, Agent, or Firm* — Cathy Hewitt; Michael Dae

(57) ABSTRACT

A method for visualizing parametric logging data includes interpreting logging data sets, each logging data set corresponding to a distinct value of a progression parameter, calculating a geometric image including a representation of data from each of the logging data sets corresponding to a wellbore measured depth, and displaying the geometric image(s) at a position along a well trajectory corresponding to the wellbore measured depth. The progression parameter includes time, a resistivity measurement depth, differing tool modes that are sampling different volumes of investigation, and/or sampling different physical properties. The geometric images include a number of parallel lines having lengths determined according to the logging data and/or an azimuthal projection of the logging data, a number of concentric axial projections, and/or shapelets determined from parallel lines and/or concentric axial projections. The method includes dynamically determining a selected measured depth, measured depth interval, and/or azimuthal projection angle.

26 Claims, 6 Drawing Sheets

(56) References Cited

U.S. PATENT DOCUMENTS

| | | | |
|---|---|---|---|
| 6,856,910 B2* | 2/2005 | Goswami et al. | 702/10 |
| 7,340,347 B2* | 3/2008 | Shray et al. | 702/11 |
| 2001/0056575 A1* | 12/2001 | Wei et al. | 725/41 |
| 2003/0043170 A1* | 3/2003 | Fleury | 345/619 |
| 2003/0234782 A1* | 12/2003 | Terentyev et al. | 345/421 |
| 2004/0204855 A1* | 10/2004 | Fleury et al. | 702/6 |
| 2004/0210392 A1 | 10/2004 | Fleury et al. | |
| 2004/0260510 A1* | 12/2004 | Du | 702/179 |
| 2006/0241867 A1* | 10/2006 | Kuchuk et al. | 702/13 |
| 2008/0208477 A1* | 8/2008 | Kelfoun | 702/11 |
| 2009/0254281 A1* | 10/2009 | Hruska et al. | 702/7 |

OTHER PUBLICATIONS

Tominski, et al., "3D Information Visualization for Time Dependent Data on Maps", Proceedings of the Ninth International Conference on Information Visualization, 2005, pp. 175-181.

* cited by examiner

US 9,047,689 B2

METHOD AND APPARATUS FOR VISUALIZING MULTI-DIMENSIONAL WELL LOGGING DATA WITH SHAPELETS

CROSS-REFERENCE TO RELATED APPLICATIONS

This patent application is an application filed under 35 U.S.C. §371 of, and claiming the benefit of and priority to, International Application Number PCT/US2009/060793, filed on 15 Oct. 2009, claiming the benefit of and priority to U.S. Provisional Patent Application No. 61/184,259, filed on 4 Jun. 2009.

BACKGROUND

The technical field generally relates to visualization of well logging data. Well logging data is often presented in a strip chart format, where visualization of the data relative to an overall reservoir, formation, and true vertical depth is difficult. Further, well logging data that changes parametrically, for example over time, at different logging tool settings such as resistivity sensor/transmitter distances or present wellbore pressure, cannot be easily visualized in present logging display packages. Finally, visualization of logging data relative to other available data (e.g., seismic, production by formation, etc.) along a wellbore trajectory is not readily available in the present art. Visualization of logging data that changes over time or other parameter, projected along a wellbore, and potentially able to be compared to other reservoir models and measurements, is potentially valuable for modeling and managing reservoirs and determining well completion and maintenance activities. Therefore, further technological developments are desirable in this area.

SUMMARY

One embodiment is a unique method for. Other embodiments include unique systems and apparatus to. Further embodiments, forms, objects, features, advantages, aspects, and benefits shall become apparent from the following description and drawings.

DESCRIPTION OF THE ILLUSTRATIVE EMBODIMENTS

Figure 1:
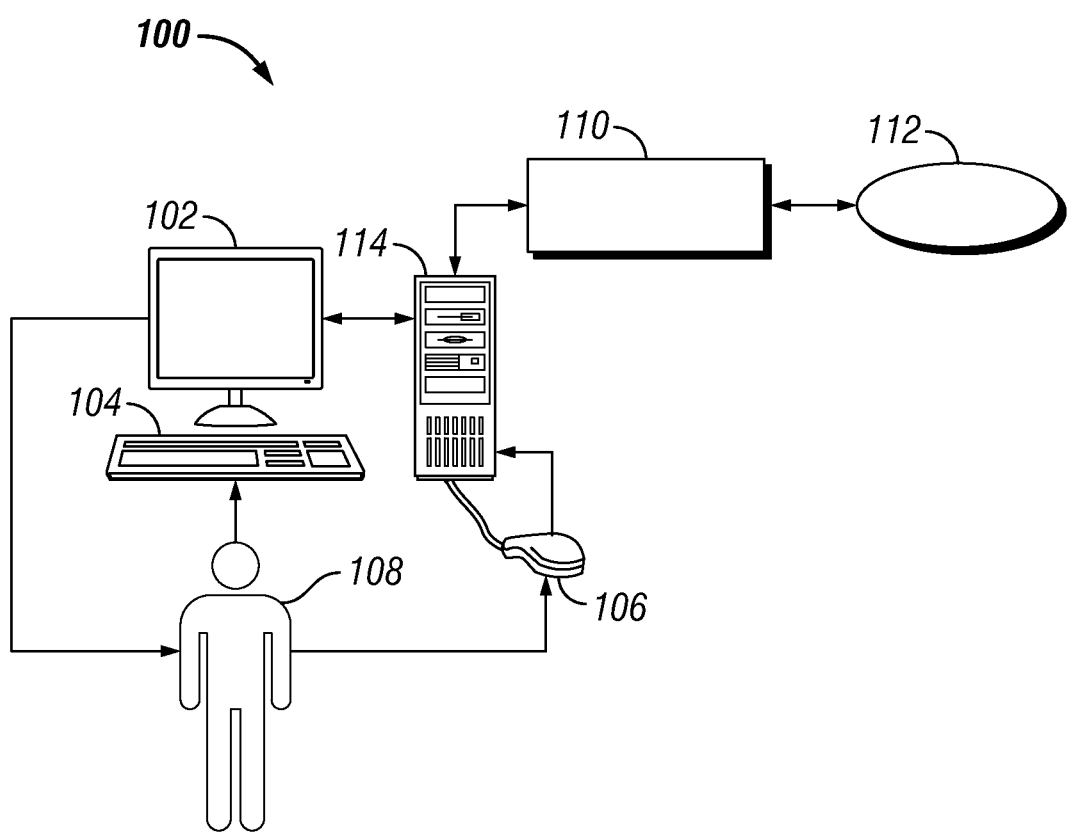
FIG. 1 is a schematic block diagram of a system for visualizing parametric logging data.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic block diagram of a system 100 for visualizing parametric logging data. The system 100 includes a display device 102 and user inputs 104, 106 accessible to a user 108. The system 100 further includes a processing subsystem 110 and logging data sets 112. The logging data sets 112 each correspond to a distinct value of a progression parameter. For example, the logging data sets 112 may include three logging data sets 112, each corresponding to a separate time value, a separate resistivity measurement, differing tool modes that are sampling different volumes of investigation, and/or differing tool modes that are sampling different physical properties. Other parametric values known in the art are contemplated herein, for example a wellbore pressure value (e.g. a first cement bond log with a pressurized wellbore and a second cement bond log with a non-pressurized wellbore), or an amount of fluid produced from or injected into a wellbore.

The processing subsystem 110 includes a controller structured to execute certain operations for visualizing parametric logging data. The processing subsystem 110 is illustrated as a single computing device, but the processing subsystem 110 can include one or more computers, and/or hard-wired elements in hardware. The processing subsystem 110 is in communication with the display device 102 and the user inputs 104, 106, and the processing subsystem 110 may be a computer associated with the devices 102, 104, 106 or a computer in communication with the devices. In the illustrated system 100, a user computer 114 is associated with the devices 102, 104, 106 and is in communication with the processing subsystem 110. The display device 102 is illustrated as a computer monitor, but the display device may be any display device known in the art including at least a printout or accessible electronic data. The logging data sets 112 are accessible to the processing subsystem 110. The logging data sets 112 may be stored on the processing subsystem 110, stored on a computer readable medium accessible through a datalink or network to the processing subsystem 110, and/or may be supplied at least partially in real-time from logging equipment (not shown) to the processing subsystem 110.

Figure 2:
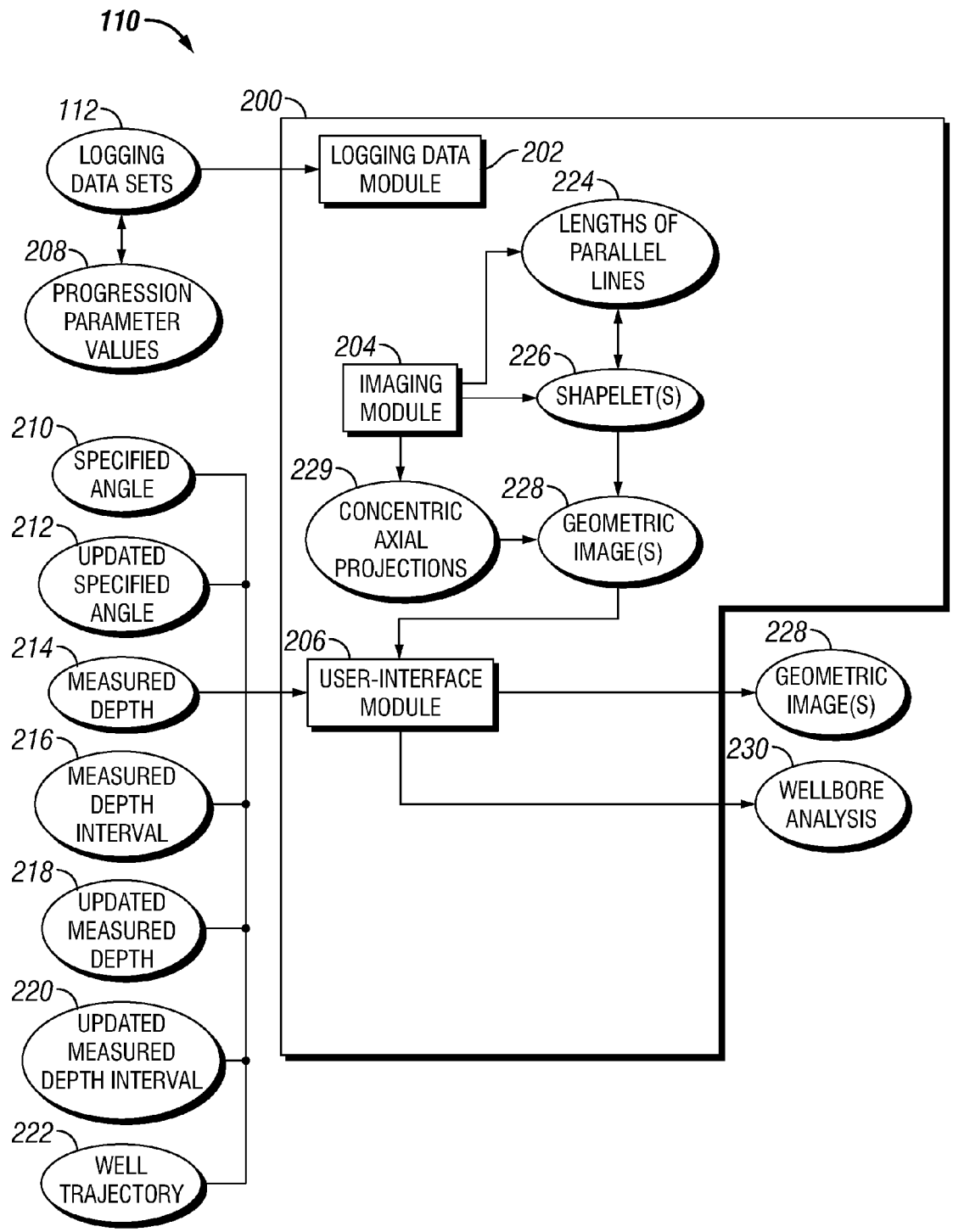
FIG. 2 is an illustration of a processing subsystem for visualizing parametric logging data.

FIG. 2 is an illustration of a processing subsystem 110 for visualizing parametric logging data. The processing subsystem 110 includes a controller 200 having modules that execute certain operations for visualizing parametric logging data. The controller 200 is shown as a single device to simplify description. However, the controller 200 may include multiple devices, distributed devices, some devices that are hardware and/or include a software component. Further, the logging data sets 112 may be stored on the controller 200 and/or communicated to the controller 200. The controller 200 may include devices that are physically remote from other components of the system 100 but that are at least intermittently in communication with the system via network, datalink, internet, or other communication means.

The controller 200 includes modules structured to functionally execute operations for visualizing parametric logging data. The description herein includes the use of modules to highlight the functional independence of the features of the elements described. A module may be implemented as operations by software, hardware, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or part with other modules or devices. The operations of any module may be performed wholly or partially in hardware, software, or by other modules. The presented organization of the modules is exemplary only, and other organizations that perform equivalent functions are contemplated herein. Modules may be implemented in hardware and/or software on computer readable medium, and modules may be distributed across various hardware or software components.

The controller 200 includes a logging data module 202 that interprets the logging data sets 112. Each logging data set 112 corresponds to a distinct value of progression parameter values 208. Interpreting as used herein includes determining the logging data sets 112 through any means understood in the art, including at least receiving the logging data sets 112 from a logging device, reading the logging data sets 112 from a computer readable memory location, and/or receiving the logging data sets 112 as a datalink, network, or electronic data communication.

Figure 3:
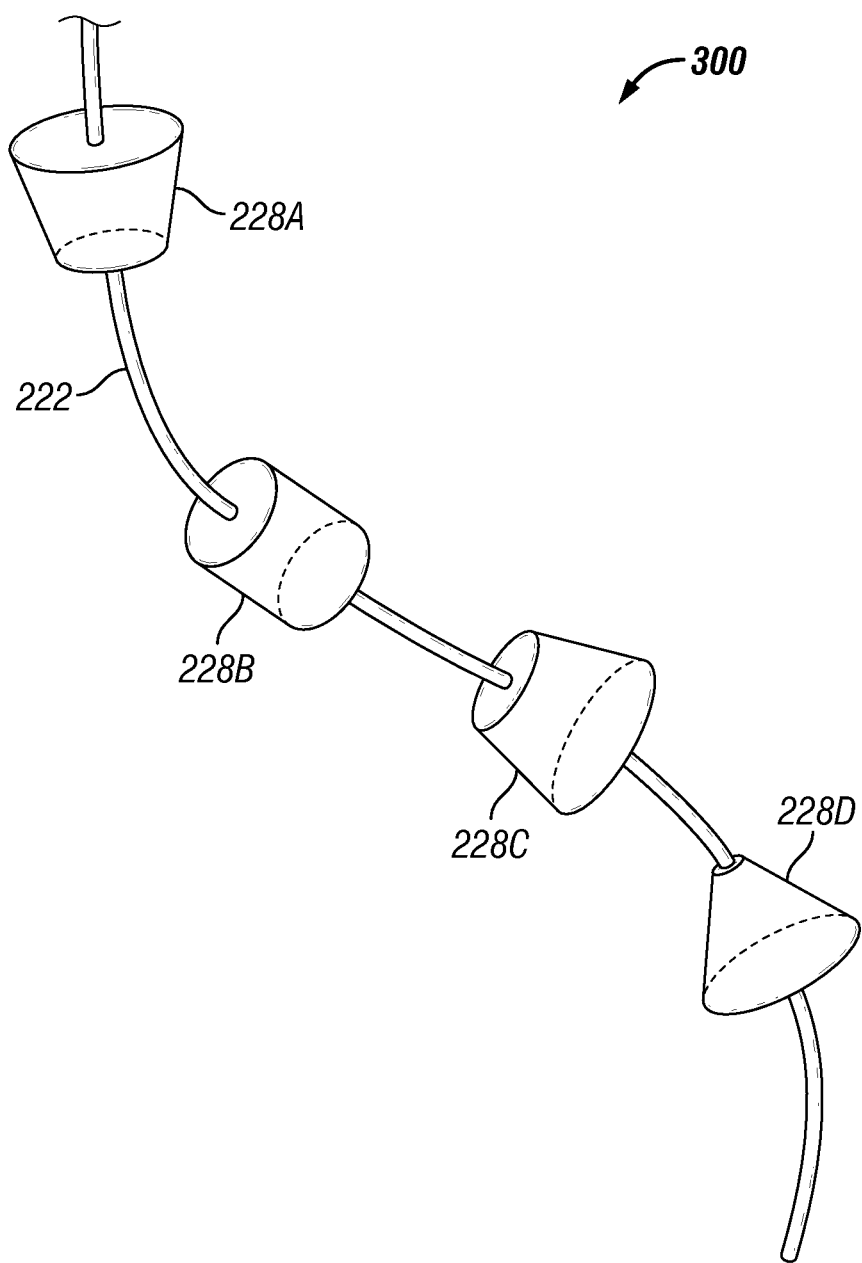
FIG. 3 is an illustration of a plurality of geometric images displayed along a well trajectory.
Figure 4:
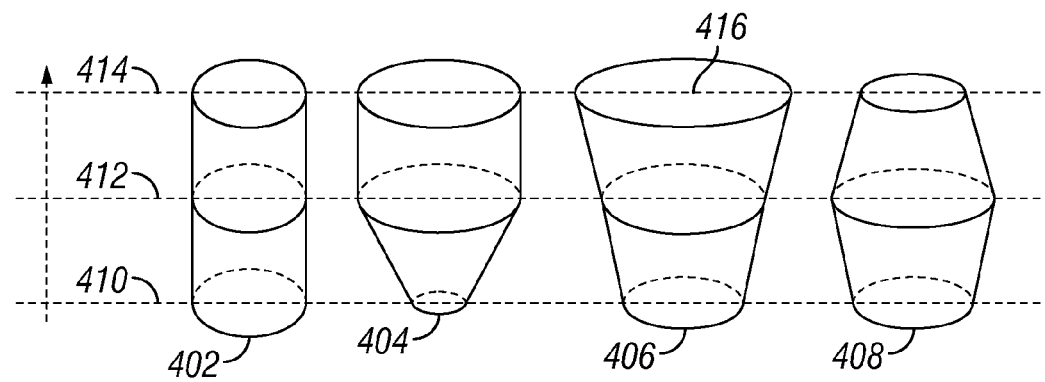
FIG. 4 is an illustration of a plurality of geometric images including a plurality of parallel lines.
Figure 5:
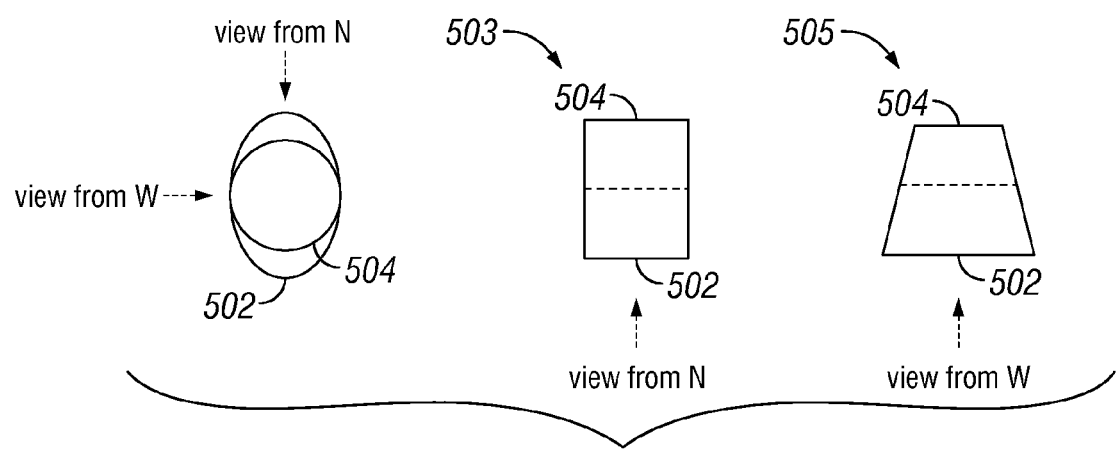
FIG. 5 is an illustration of geometric images including parallel lines and corresponding to an azimuthal projection of data from logging data sets.

The controller 200 further includes an imaging module 204 that calculates a geometric image 228, where the geometric image 228 is a representation of data from each of the logging data sets 112 corresponding to one or more wellbore measured depth 214 locations. The user-interface module 206, in one example, interprets a cursor position and determines an updated measured depth 218 in response to the cursor position. Each geometric image 228 is any graphical representation of the data, including, without limitation, a plurality of parallel lines having lengths 224 representative of the data, shapelets 226 formed from a plurality of parallel lines, concentric axial projections 229 having a size and/or shape representative of the logging data, any three-dimensional representation including a shapelet 226 determined from parallel lines or concentric axial projections 229, a shapelet 226 including a plurality of two-dimensional shapes (e.g. circles, ellipses, etc.) each projected onto a distinct parallel planes, and/or any other graphical representation of the logging data. FIG. 3 and FIG. 4 illustrate one example of geometric images comprising shapelets including two-dimensional shapes each projected onto a distinct parallel plane. FIG. 5 illustrates one example of geometric images (e.g. elements 503, 505) comprising a plurality of parallel lines. FIG. 5 further illustrates one example of a geometric image (e.g. elements 502, 504) comprising concentric axial projections. The controller 200 further includes a user-interface module 206 that provides the geometric image(s) 228, at a position along a wellbore trajectory 222 corresponding to the wellbore measured depth 214, to a display device 102.

In certain embodiments, the imaging module 204 further determines lengths of parallel lines 224, each line corresponding to data from one of the logging data sets 112, and the user-interface module 206 provides a shapelet 226, including the parallel lines, to the display device 102. In further embodiments, the parallel lines correspond to an azimuthal projection of data from the logging data sets 112 from a specified angle 210. The specified angle 210 includes a viewing angle, a projection angle, or any other angle of interest utilized in analyzing the logging data. In certain embodiments, the specified angle 210 is the angle from which a user requests to visualize the logging data, an angle showing a maximum variance of the logging data between the logging data sets 112, and/or a default viewing or projection angle. Referencing FIG. 5, concentric axial projections 229 of data from a first logging data set 504 and from a second logging data set 502 are illustrated. The logging data 502, 504 may represent any type of data, but in one example may be oriented caliper data showing a wellbore that has changed shape over time. The wellbore shape change over time may be due to stress anisotropy, erosion, changes from fluid flowing in the wellbore, or for any other reason understood in the art. A first projection 503 illustrates the logging data 502, 504 from a specified angle 210 that is a view from the North azimuthal angle, and a second projection 505 illustrates the logging data 502, 504 from a specified angle 210 that is a view from the West azimuthal angle. In certain embodiments, the user-interface module 206 interprets an updated specified angle 212, and the imaging module 204 re-calculates the lengths of the lines 224 in response to the updated specified angle 212, for example changing the line lengths from the first projection 503 to the second projection 505 in response to the specified angle 210 (North) and the updated specified angle 212 (West).

In certain embodiments, the imaging module 204 further calculates concentric axial projections 229, each concentric axial projection 229 corresponding to data from one of the logging data sets 112. The user-interface module 206 further provides the concentric axial projections 229 to the display device 102. Referencing FIG. 4, a plurality of geometric images 402, 404, 406, 408 each include a plurality of concentric axial projections 229 corresponding to logging data sets 112 having distinct values 410, 412, 414 of a progression parameter. For example, the values related to 410 may be values from a first caliper log, the values 412 may be values from a second caliper log, and the values 414 may be values from a third caliper log. In one example, each of the geometric images 402, 404, 406, 408 include data at a distinct measured depth 214 value of a wellbore. However, the geometric images 402, 404, 406, 408 are illustrative only. In one example, the progression parameter values 410, 412, 414 include time values. The geometric image 402 is consistent with logging data which is stable over time, the geometric image 404 is consistent with logging data which increases between the time at 410 and the time at 412 and is stable thereafter, the geometric image 406 is consistent with logging data which increases over time, and the geometric image 408 is consistent with logging data which increases between the time at 410 and 412 and then reduces between the time at 412 and 414.

The geometric images 402, 404, 406, 408 may show azimuthal data where the logging data sets 112 are oriented. Where the logging data sets 112 are not oriented or where a simplified display is desirable, the geometric images 402, 404, 406, 408 can be shown as representative averages and/or interpolated values. The concentric axial projections 229 can be projected in a three-dimensional view, for example as illustrated in FIG. 4, or in a two-dimensional view, for example as illustrated in FIG. 5. The geometric images 402, 404, 406, 408 can include parallel lines such as the line 416 illustrated in FIG. 4. In certain embodiments, the geometric images are defined by the parallel lines, for example the geometric images 503, 505 as illustrated in FIG. 5.

In certain embodiments, the imaging module 204 calculates geometric images 228 over a specified interval of the wellbore measured depth 216, and the user-interface module 206 provides the geometric images 228 along the wellbore trajectory 222 corresponding to the specified interval of the wellbore measured depth 216 to the display device 102. In a further embodiment, the user-interface module 206 further interprets an updated interval of the wellbore measured depth 220, and the imaging module 204 re-calculates the geometric images 228 over the updated interval of the wellbore measured depth 220. Referencing FIG. 3, a number of geometric images 228a, 228b, 228c, 228d are displayed at positions along a wellbore trajectory 222 corresponding to the position of the data from the logging data sets 112. The geometric images 228a, 228b, 228c, 228d are shown at intervals requested by a user 108, according to the resolution of the underlying logging data, at intervals selected to illustrate the formations of interest in the specified interval of the wellbore measured depth 216, or at any other intervals known in the art. For example, one of the geometric images 228a, 228b, 228c, 228d illustrated in FIG. 3 may be shown for each major geographic layer intersected by the wellbore. The geometric images 228a, 228b, 228c, 228d are illustrated as three-dimensional projections, but may be shown as two-dimensional shapelets or concentric axial projections in two dimensions such as illustrated in FIG. 5.

In certain embodiments, the user-interface module 206 accepts user inputs to update the displayed interval of the wellbore measured depth, the angle of the display, the type of data from the logging data sets 112 that is to be illustrated, and/or the type of geometric images 228a, 228b, 228c, 228d that is to be shown. The imaging module 204 re-calculates the geometric images 228a, 228b, 228c, 228d to be displayed according to the user inputs, and the user-interface module 206 provides the updated geometric images 228a, 228b, 228c, 228d in response to the user inputs. The user inputs may be accepted as user keyboard inputs and/or user mouse inputs. In certain embodiments, the user 108 performs a click-and-drag on a display image (e.g. the illustration 300) and the user-interface module 206 interprets the updated specified angle 212, updated measured depth 218, and/or updated measured depth interval 220 in response to the click-and-drag action. In certain embodiments, the user 108 performs a zoom level command and the user-interface module 206 interprets the updated measured depth interval 220 in response to the zoom level command.

In certain embodiments, the user 108 moves a cursor (or other user interaction display element) along the wellbore trajectory 222, the imaging module 204 re-calculates a geometric image 228 dynamically in response to the cursor position, and the user-interface module 206 displays the dynamically calculated geometric image 228.

In certain embodiments, the geometric images 228 illustrate a wellbore analysis 230 based on the logging data sets 112, and the user-interface module 206 displays the wellbore analysis 230. For example, and without limitation, the geometric images 228 may display a borehole shape and stress direction, a fluid invasion depth, a rock property description (non-limiting examples include a Young's modulus, Poisson's ratio, fracture gradient, porosity, and/or permeability), a log data comparison to non-log data such as logging data compared to production (a non-limiting example including cumulative production), productivity (a non-limiting example including a current, peak, or defined time (e.g. 30 days after stimulation) production rate), and/or seismic data. The wellbore analysis 230 includes the analysis variable at a plurality of values of a progression parameter, where the progression parameter is time, investigation depth, tool mode, or other progressive parameter.

Figure 6:
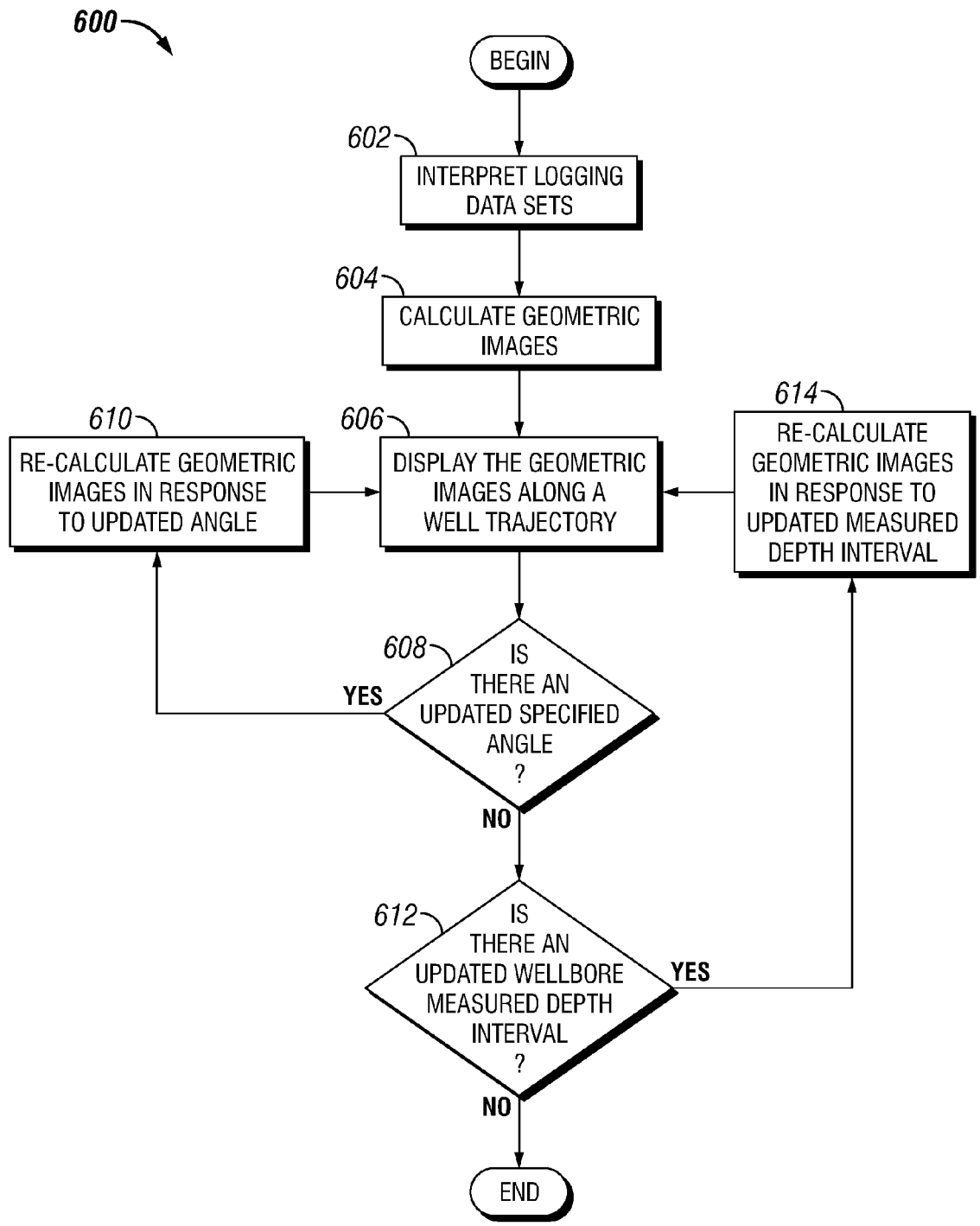
FIG. 6 is a schematic flow diagram of a technique for visualizing parametric logging data.
Figure 7:
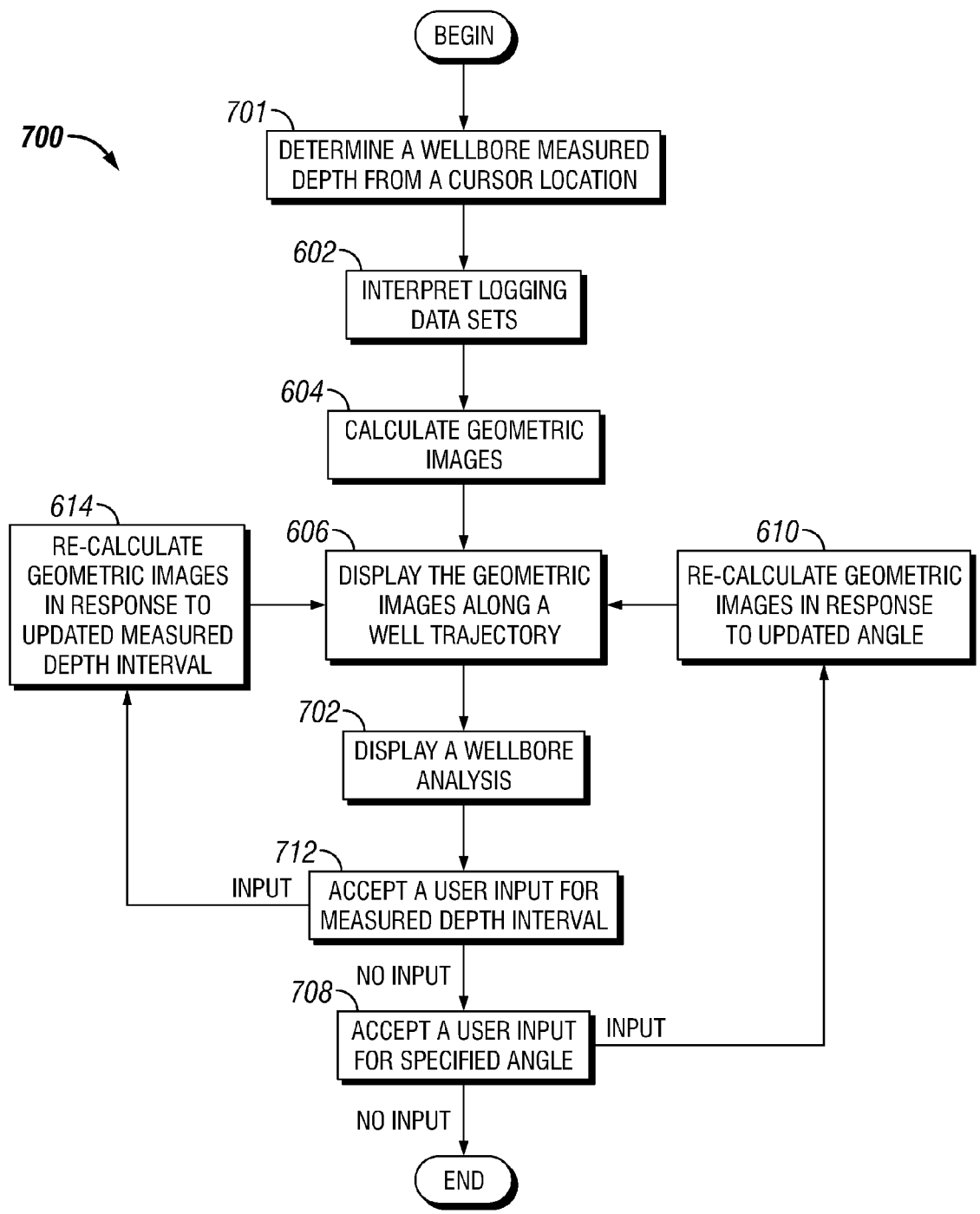
FIG. 7 is a schematic flow diagram of another technique for visualizing parametric logging data.

The schematic flow diagrams in FIGS. 6 to 7, and related descriptions which follow, provide illustrative embodiments of performing techniques or procedures for visualizing parametric logging data. Operations illustrated are understood to be exemplary only, and operations illustrated may be combined or divided, and added or removed, as well as re-ordered in whole or part, unless stated explicitly to the contrary herein. Operations illustrated may be implemented by a computer executing a computer program product on a computer readable medium, where the computer program product comprises instructions causing the computer to execute one or more of the operations.

FIG. 6 is a schematic flow diagram of a technique 600 for visualizing parametric logging data. The technique 600 includes an operation 602 to interpret logging data sets, each logging data set corresponding to a distinct value of a progression parameter, and an operation 604 to calculate a geometric image including a representation of data from each of the logging data sets corresponding to a wellbore measured depth. The technique 600 further includes an operation 606 to display the geometric image at a position along a well trajectory corresponding to the wellbore measured depth.

In certain embodiments, the operation 604 to calculate the geometric images includes determining a length of a plurality of parallel lines, each line corresponding to data from one of the logging data sets, and the operation 606 to display the geometric images includes showing a shapelet having the parallel lines. In certain embodiments, the operation 604 to calculate the geometric images includes determining a plurality of concentric axial projections, where each concentric axial projection corresponds to data from one of the logging data sets, and the operation 606 to display the geometric images includes showing the concentric axial projections or showing a shapelet having the concentric axial projections.

In certain embodiments, the geometric images include an azimuthal projection of data from the logging data sets from a specified angle, and the technique 600 includes an operation 608 to determine an updated specified angle, and an operation 610 to recalculate the geometric images in response to the updated specified angle.

In certain embodiments, the operation 604 to calculate the geometric images includes calculating geometric images over a specified interval of the wellbore measured depth, and the operation 606 to display the geometric images includes showing the geometric images along the well trajectory corresponding to the specified interval of the wellbore measured depth. The technique 600 further includes an operation 612 to determine an updated interval of the wellbore measured depth, and an operation 614 to re-calculate the geometric images over the updated interval of the wellbore measured depth in response to the updated interval.

FIG. 7 is a schematic flow diagram of another technique 700 for visualizing parametric logging data. The technique 700 includes an operation 701 to determine a cursor location with respect to a well trajectory and determining a wellbore measured depth in response to the cursor location. In addition to the operations 602, 604, 606 of the technique 600 illustrated in FIG. 6, the technique 700 includes an operation 702 to display a wellbore analysis. The wellbore analysis includes any wellbore data extracted or abstracted from the logging data sets. Non-limiting examples of a wellbore analysis include a borehole shape over time, a fluid invasion depth over time, a rock property description versus depth, a log data comparison to non-log data, a sonic log data comparison to seismic data, a resistivity log data comparison wherein each logging data set corresponds to a distinct value of sensor and transmitter spacings, a log data comparison wherein each logging data set corresponds to a distinct tool mode sampling a distinct volume of investigation, and/or a log data comparison wherein each logging data set corresponds to a distinct tool mode sampling a distinct physical property of a formation.

In certain embodiments, the operation 604 to calculate the geometric images includes calculating geometric images over a specified interval of the wellbore measured depth, and the operation 606 to display the geometric images includes showing the geometric images along the well trajectory corresponding to the specified interval of the wellbore measured depth. The technique 600 further includes an operation 612 to determine an updated interval of the wellbore measured depth, and an operation 614 to re-calculate the geometric images over the updated interval of the wellbore measured depth in response to the updated interval.

In certain embodiments, the geometric images include an azimuthal projection of data from the logging data sets from a specified angle, and the technique 700 includes an operation 708 to interpret a user keyboard input and/or a user click-and-drag input to determine an updated specified angle, and an operation 610 to recalculate the geometric images in response to the updated specified angle.

In certain embodiments, the operation 604 to calculate the geometric images includes determining a length of a plurality of parallel lines, each line corresponding to data from one of the logging data sets, and the operation 606 to display the geometric images includes showing a shapelet having the parallel lines. In certain embodiments, the operation 604 to calculate the geometric images includes determining a plurality of concentric axial projections, where each concentric axial projection corresponds to data from one of the logging data sets, and the operation 606 to display the geometric images includes showing the concentric axial projections or showing a shapelet having the concentric axial projections.

In certain embodiments, the operation 604 to calculate the geometric images includes calculating geometric images over a specified interval of the wellbore measured depth, and the operation 606 to display the geometric images includes showing the geometric images along the well trajectory corresponding to the specified interval of the wellbore measured depth. The technique 700 further includes an operation 712 to interpret user input such as a user keyboard input, a user click-and-drag input, and/or a user zoom level command, and to determine an updated interval of the wellbore measured depth in response to the user input. The technique 700 further includes an operation 614 to re-calculate the geometric images over the updated interval of the wellbore measured depth in response to the updated interval.

As is evident from the figures and text presented above, a variety of embodiments according to the present invention are contemplated.

A method includes interpreting a plurality of logging data sets, each logging data set corresponding to a distinct value of a progression parameter, calculating a geometric image comprising a representation of data from each of the logging data sets corresponding to a wellbore measured depth, and displaying the geometric image at a position along a well trajectory corresponding to the wellbore measured depth. The progression parameter includes time, a tool mode, and/or a resistivity measurement depth. Calculating the geometric image includes determining a length of a plurality of parallel lines, each line corresponding to data from one of the logging data sets, and the displaying further includes showing a shapelet comprising the parallel lines. Each parallel line may correspond to an azimuthal projection of data from the logging data sets from a specified angle. Certain embodiments of the method include interpreting an updated specified angle, and re-calculating the lengths of the plurality of lines in response to the updated specified angle. In certain embodiments, the calculating further includes determining a plurality of concentric axial projections, where each concentric axial projection corresponds to data from one of the logging data sets, and wherein the displaying further includes showing the concentric axial projections.

In certain embodiments, the method further calculating geometric images over a specified interval of the wellbore measured depth, and displaying the geometric images along the well trajectory corresponding to the specified interval of the wellbore measured depth. The method further includes interpreting an updated interval of the wellbore measured depth, and re-calculating the geometric images over the updated interval of the wellbore measured depth.

Another exemplary embodiment is an apparatus including a logging data module that interprets logging data sets, where each logging data set corresponds to a distinct value of a progression parameter, an imaging module that calculates a geometric image including a representation of data from each of the logging data sets corresponding to a wellbore measured depth, and a user-interface module that provides the geometric image at a position along a well trajectory corresponding to the wellbore measured depth to a display device. The progression parameter includes a time, a tool mode, and/or a resistivity measurement depth. The apparatus further includes the imaging module determining lengths of a plurality of parallel lines, each line corresponding to data from one of the logging data sets, and the user-interface module provides a shapelet including the parallel lines to the display device. The parallel lines may correspond to an azimuthal projection of data from the logging data sets from a specified angle. In certain embodiments, the user-interface module interprets an updated specified angle, and the imaging module re-calculates the lengths of the plurality of lines in response to the updated specified angle.

In certain embodiments, the imaging module further calculates a plurality of concentric axial projections, each concentric axial projection corresponding to data from one of the logging data sets, and the user-interface module further provides the concentric axial projections to the display device. The exemplary imaging module further calculates geometric images over a specified interval of the wellbore measured depth, and the user-interface module further provides the geometric images along the well trajectory corresponding to the specified interval of the wellbore measured depth to the display device. The user-interface module further interprets an updated interval of the wellbore measured depth, and the imaging module re-calculates the geometric images over the updated interval of the wellbore measured depth.

Yet another exemplary embodiment is a method, which may be a computer program product that is a computer useable medium having a computer readable program, where the computer readable program when executed on a computer causes the computer to execute operations of the method. The method includes interpreting logging data sets, each logging data set corresponding to a distinct value of a progression parameter, calculating a geometric image including a representation of data from each of the logging data sets corresponding to a wellbore measured depth, and displaying the geometric image at a position along a well trajectory corresponding to the wellbore measured depth. The method further includes displaying a wellbore analysis that is a borehole shape and stress direction over time, a fluid invasion depth over time, a rock property description versus depth, a log data comparison to non-log data, and/or a sonic log data comparison to seismic data.

The method further includes determining lengths of a plurality of parallel lines, each line corresponding to data from one of the logging data sets, and displaying a shapelet including the parallel lines. In a further embodiment, the method further includes determining lengths of the parallel lines, where each line corresponds to an azimuthal projection of data from the logging data sets from a specified angle. The method further includes interpreting an updated specified angle, and re-calculating the lengths of the plurality of lines in response to the updated specified angle. The method further includes interpreting the updated specified angle via a user keyboard input and/or a user click-and-drag input.

The exemplary method further includes determining a plurality of concentric axial projections, each concentric axial projection corresponding to data from one of the logging data sets, and displaying the concentric axial projections. The method further includes calculating geometric images over a specified interval of the wellbore measured depth, and to displaying the geometric images along the well trajectory corresponding to the specified interval of the wellbore measured depth. In a further embodiment, the method further includes interpreting an updated interval of the wellbore measured depth, and re-calculating the geometric images over the updated interval of the wellbore measured depth. The method further includes interpreting the updated interval of the wellbore measured depth via a user keyboard input, a user click-and-drag input, and/or a user zoom level command. The method further includes determining a cursor location with respect to the well trajectory and determining the wellbore measured depth in response to the cursor location.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   interpreting a plurality of logging data sets, each logging data set corresponding to a distinct value of a progression parameter, wherein the progression parameter comprises a tool mode, wherein the tool mode comprises a volume of investigation, and wherein each distinct value of the progression parameter corresponds to a different volume of investigation;
   calculating a geometric image comprising a representation of data from each of the logging data sets corresponding to a wellbore measured depth; and
   displaying the geometric image at a position along a well trajectory corresponding to the wellbore measured depth.

2. The method of claim 1, wherein the calculating comprises determining a length of a plurality of parallel lines, each line corresponding to data from one of the logging data sets, and wherein the displaying comprises showing a shapelet comprising the parallel lines.

3. The method of claim 2, wherein the calculating comprises determining lengths of a plurality of parallel lines, each line corresponding to an azimuthal projection of data from the logging data sets from a specified angle.

4. The method of claim 3, comprising interpreting an updated specified angle, and re-calculating the lengths of the plurality of lines in response to the updated specified angle.

5. The method of claim 1, wherein the calculating comprises determining a plurality of concentric axial projections, each concentric axial projection corresponding to data from one of the logging data sets, and wherein the displaying comprises showing the concentric axial projections.

6. The method of claim 1, comprising calculating a plurality of geometric images over a specified interval of the wellbore measured depth, and displaying the plurality of geometric images along the well trajectory corresponding to the specified interval of the wellbore measured depth.

7. The method of claim 6, comprising interpreting an updated interval of the wellbore measured depth, and re-calculating the plurality of geometric images over the updated interval of the wellbore measured depth.

8. An apparatus, comprising:
   a logging data module structured to interpret a plurality of logging data sets, each logging data set corresponding to a distinct value of a progression parameter, wherein the progression parameter comprises a tool mode, wherein the tool mode comprises a sampled physical property, and wherein each distinct value of the progression parameter corresponds to a different sampled physical property;
   an imaging module structured to calculate a geometric image comprising a representation of data from each of the logging data sets corresponding to a wellbore measured depth; and
   a user-interface module structured to provide the geometric image at a position along a well trajectory corresponding to the wellbore measured depth to a display device.

9. The apparatus of claim 8, wherein the imaging module is structured to determine lengths of a plurality of parallel lines, each line corresponding to data from one of the logging data sets, and wherein the user-interface module is structured to provide a shapelet comprising the parallel lines to the display device.

10. The apparatus of claim 8, wherein the imaging module is structured to determine a plurality of two-dimensional shapes each projected onto a distinct parallel plane, and wherein the user-interface module is structured to provide a shapelet comprising the two-dimensional shapes to the display device.

11. The apparatus of claim 9, wherein each of the plurality of parallel lines corresponds to an azimuthal projection of data from the logging data sets from a specified angle.

12. The apparatus of claim 10, wherein the user-interface module is structured to interpret an updated specified angle, and wherein the imaging module is structured to re-calculate the lengths of the plurality of lines in response to the updated specified angle.

13. The apparatus of claim 8, wherein the imaging module is structured to calculate a plurality of concentric axial projections, each concentric axial projection corresponding to data from one of the logging data sets, and wherein the user-interface module is structured to provide the concentric axial projections to the display device.

14. The apparatus of claim 8, wherein the imaging module is structured to calculate a plurality of geometric images over a specified interval of the wellbore measured depth, and wherein the user-interface module is structured to provide the plurality of geometric images along the well trajectory corresponding to the specified interval of the wellbore measured depth to the display device.

15. The apparatus of claim 14, wherein the user-interface module is structured to interpret an updated interval of the wellbore measured depth, and wherein the imaging module is structured to re-calculate the plurality of geometric images over the updated interval of the wellbore measured depth.

16. A computer program product comprising a non-transitory computer useable medium having a computer readable program, wherein the computer readable program when executed on a computer causes the computer to:

interpret a plurality of logging data sets, each logging data set corresponding to a distinct value of a progression parameter, wherein the progression parameter comprises a tool mode, wherein the tool mode comprises a volume of investigation, and wherein each distinct value of the progression parameter corresponds to a different volume of investigation;

calculate a geometric image comprising a representation of data from each of the logging data sets corresponding to a wellbore measured depth; and display the geometric image at a position along a well trajectory corresponding to the wellbore measured depth.

17. The computer program product of claim 16, wherein the computer readable program when executed on the computer causes the computer to display a wellbore analysis comprising a borehole shape change over time; a fluid invasion over time into a formation; a rock property description versus depth; a log data comparison to non-log data; and a sonic log data comparison to seismic data; a resistivity log data comparison wherein each logging data set corresponds to a distinct value of sensor and transmitter spacings; a log data comparison wherein each logging data set corresponds to a distinct tool mode sampling a distinct volume of investigation; or a log data comparison wherein each logging data set corresponds to a distinct tool mode sampling a distinct physical property of a formation; or any combination thereof.

18. The computer program product of claim 16, wherein the computer readable program when executed on the computer causes the computer to determine lengths of a plurality of parallel lines, each line corresponding to data from one of the logging data sets, and wherein the displaying comprises showing a shapelet comprising the parallel lines.

19. The computer program product of claim 18, wherein the computer readable program when executed on the computer causes the computer to determine the lengths of a plurality of parallel lines, each line corresponding to an azimuthal projection of data from the logging data sets from a specified angle.

20. The computer program product of claim 18, wherein the computer readable program when executed on the computer causes the computer to interpret an updated specified angle, and re-calculate the lengths of the plurality of lines in response to the updated specified angle.

21. The computer program product of claim 20, wherein the computer readable program when executed on the computer causes the computer to interpret the updated specified angle by one of a user keyboard input and a user click-and-drag input.

22. The computer program product of claim 16, wherein the computer readable program when executed on the computer causes the computer to determine a plurality of concentric axial projections, each concentric axial projection corresponding to data from one of the logging data sets, and wherein the displaying comprises showing the concentric axial projections.

23. The computer program product of claim 15, wherein the computer readable program when executed on the computer causes the computer to calculate a plurality of geometric images over a specified interval of the wellbore measured depth, and displaying the plurality of geometric images along the well trajectory corresponding to the specified interval of the wellbore measured depth.

24. The computer program product of claim 22, wherein the computer readable program when executed on the computer causes the computer to interpret an updated interval of the wellbore measured depth, and recalculate the plurality of geometric images over the updated interval of the wellbore measured depth.

25. The computer program product of claim 23, wherein the computer readable program when executed on the computer causes the computer to interpret the updated interval of the wellbore measured depth by accepting a user keyboard input, interpreting a user click-and-drag input, or interpreting a user zoom level command, or any combination thereof.

26. The computer program product of claim 22, wherein the computer readable program when executed on the computer causes the computer to determine a cursor location with respect to the well trajectory and to determine the wellbore measured depth in response to the cursor location.

\* \* \* \* \*